(12) United States Patent
Nowak

(10) Patent No.: US 6,742,789 B1
(45) Date of Patent: Jun. 1, 2004

(54) FISHING POLE AND ACCESSORY CADDY ASSEMBLY

(76) Inventor: Esther C. Nowak, P.O. Box 876, Eagle River, WI (US) 54521

( * ) Notice: Subject to any disclaimer, the term of this patent is extended or adjusted under 35 U.S.C. 154(b) by 0 days.

(21) Appl. No.: 10/218,437

(22) Filed: Aug. 15, 2002

(51) Int. Cl.[7] .................................................. B62B 1/00
(52) U.S. Cl. ...................... 280/47.26; 280/652; 43/54.1
(58) Field of Search ........................... 280/47.26, 47.24, 280/47.34, 651, 652, 37, 47.35, 79.11, 79.2, 47.19; 248/98, 129; 232/43.2; 43/54.1; 206/315.1, 315.11; D34/19–22, 17, 24, 25

(56) References Cited

U.S. PATENT DOCUMENTS

| | | | | |
|---|---|---|---|---|
| 1,352,234 A | * | 9/1920 | Whitten ....................... | 248/129 |
| 2,428,954 A | * | 10/1947 | Apblett et al. ................ | 280/40 |
| 2,837,346 A | * | 6/1958 | Chambless .................... | 280/37 |
| 3,162,361 A | * | 12/1964 | Brighton et al. ............ | 232/43.2 |
| 5,333,885 A | * | 8/1994 | Pullman .................... | 280/47.19 |
| 5,378,005 A | * | 1/1995 | Norton ..................... | 280/47.26 |
| 5,797,617 A | * | 8/1998 | Lin ............................. | 280/655 |

* cited by examiner

*Primary Examiner*—Bryan Fischmann

(57) ABSTRACT

A fishing pole and accessory caddy assembly includes a base having a base wall with a front edge, a back edge and a pair of side edges. A front support is attached to the front edge. An axle is positioned adjacent to the back edge and has a pair of wheels attached thereto. A handle is attached to and extends upwardly from the base wall. The handle includes a vertically orientated elongated member. A housing has an upper wall, a lower wall and a perimeter wall extending between the upper and lower walls. The housing is vertically divided into a first half and a second half. Each of the first and second halves is hingedly coupled to the elongated member such that the housing may be selectively positioned between a closed position over the base and an open position extending outwardly from the base.

13 Claims, 3 Drawing Sheets

FISHING POLE AND ACCESSORY CADDY ASSEMBLY

BACKGROUND OF THE INVENTION

1. Field of the Invention

The present invention relates to fishing carts and more particularly pertains to a new fishing cart for providing a convenient transport system to efficiently transport various fishing equipment.

2. Description of the Prior Art

The use of fishing carts is known in the prior art. U.S. Pat. No. 5,333,885 describes a fishing cart apparatus for holding fishing equipment. Another type of fishing cart is U.S. Pat. No. 5,203,815 having an apparatus for carrying fishing equipment, which includes shelves for facilitating storage of tackle boxes. U.S. Pat. No. Des. 323,413 describes an ornamental design for a fishing equipment cart. U.S. Pat. No. 3,997,181 describes a fisherman's cart for storage of and transporting of fishing equipment. Other related patents include U.S. Pat. Nos. 4,703,944, and 4,355,818.

SUMMARY OF THE INVENTION

The object of the present invention is to provide a new fishing cart that would aid the fisherman in keeping fishing gear organized and readily available.

Another object of the present invention is to provide a new fishing cart that would eliminate the need to carry rods and tackle boxes separately, thereby eliminating the need to make several trips to and from a vehicle.

To this end, the present invention generally comprises a base including a base wall that has a front edge, a back edge and a pair of side edges. A front support is attached to and extends downward from the front edge. An axle is attached to the base wall and is positioned adjacent to the back edge. A pair of wheels is attached to opposite ends of the back edge. A handle is attached to and extends upwardly from the base wall. The handle includes a vertically orientated elongated member has a first end and a second end. The first end is attached to the base wall adjacent to the back edge. A housing includes an upper wall, a lower wall and a perimeter wall extending between the upper and lower walls, and each of the upper and lower walls has a generally rectangular shape. The housing is vertically divided into a first half and a second half. Each of the first and second halves is hingedly coupled to the elongated member such that the housing may be selectively positioned between a closed position over the base and an open position extending outwardly from the base.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
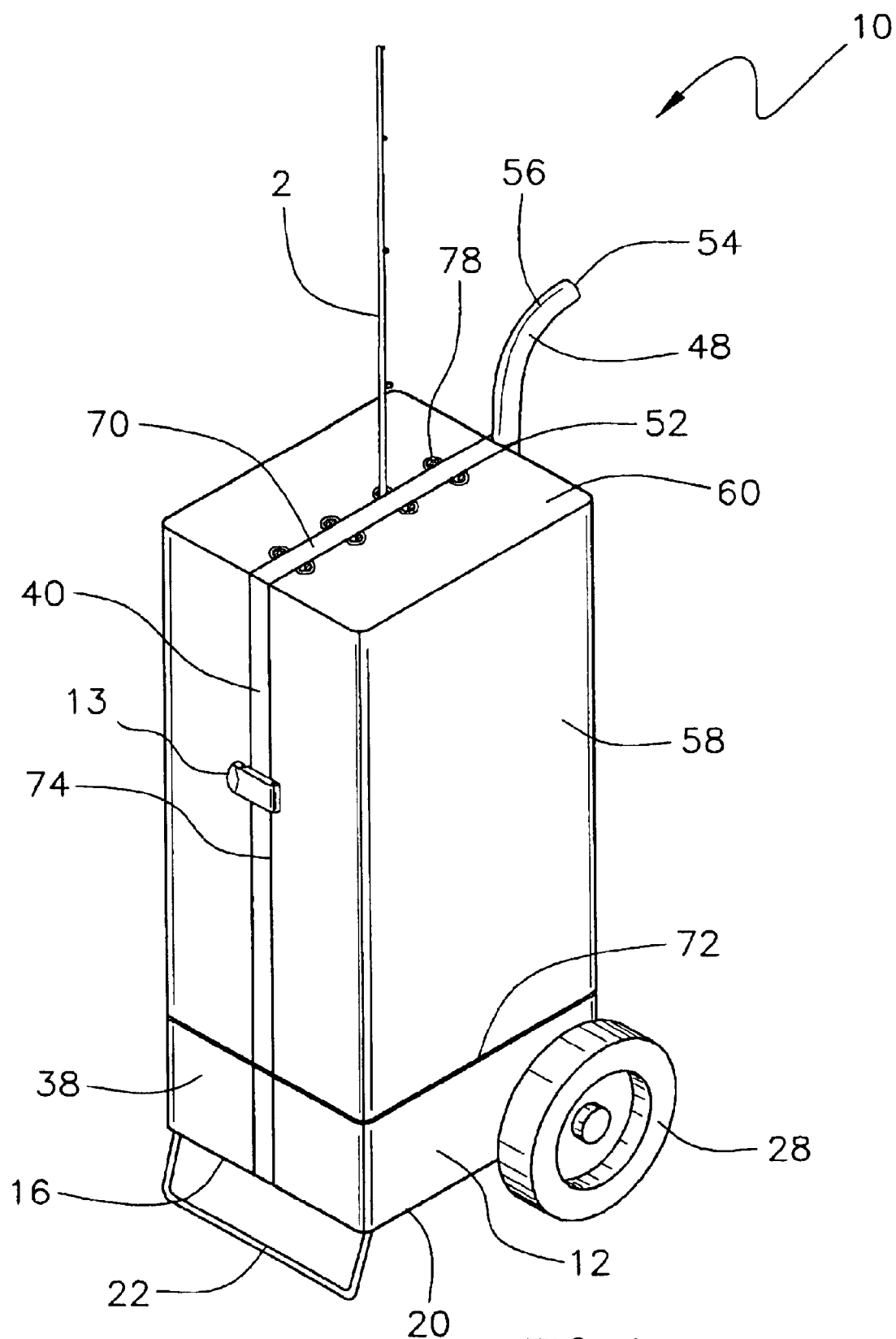
FIG. 1 is a perspective view of a fishing pole and accessory caddy assembly according to the present invention.
Figure 2:
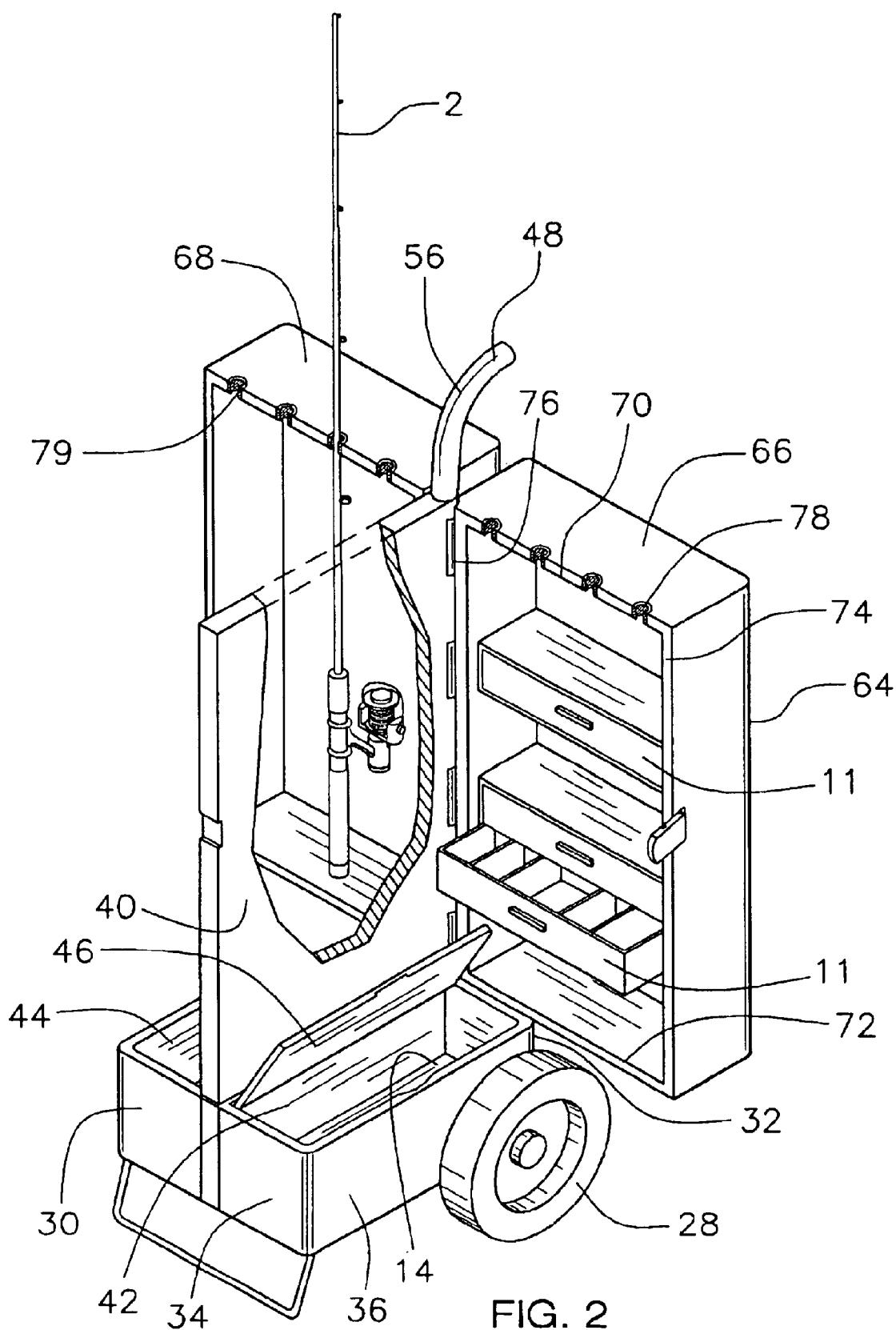
FIG. 2 is a perspective view of the present invention.
Figure 3:
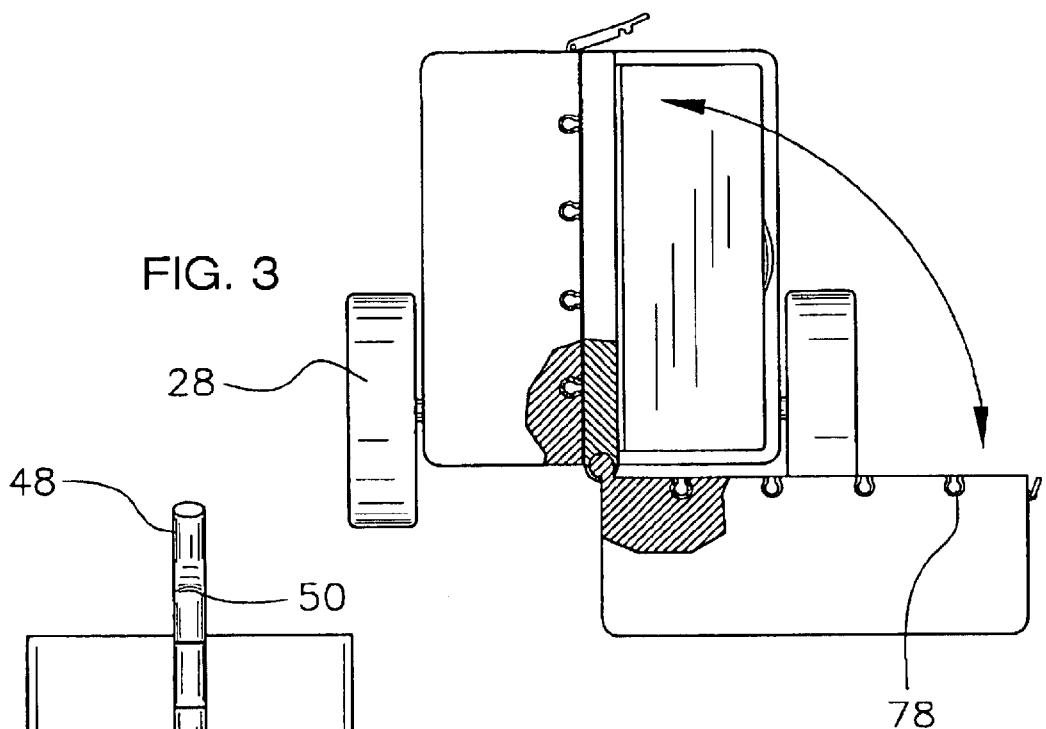
FIG. 3 is a top view of the present invention.

With reference now to the drawings, and in particular to FIGS. 1 through 4 thereof, a new fishing cart embodying the principles and concepts of the present invention and generally designated by the reference numeral 10 will be described.

Figure 4:
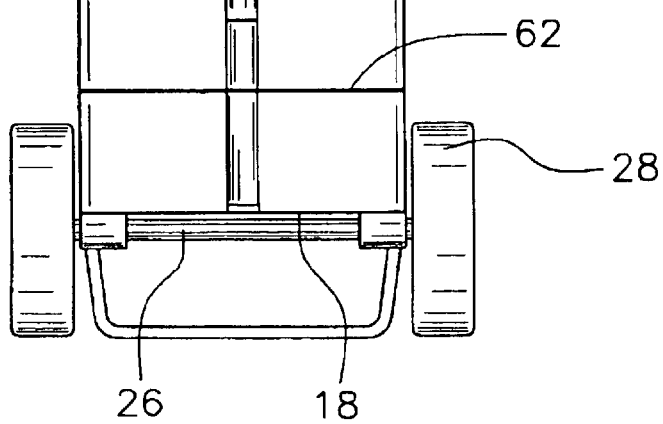
FIG. 4 is a rear view of the present invention.

As best illustrated in FIGS. 1 and 4, a fishing pole and accessory caddy assembly 10 generally comprises a base 12 that includes a base wall 14 having a front edge 16, a back edge 18 and a pair of side edges 20. A front support 22 is attached to and extends downward from the front edge 16. An axle 26 is attached to the base wall 14 and is positioned adjacent to the back edge 18, and a pair of wheels 28 is attached to opposite ends of the back edge 18. A peripheral wall 30 is attached to the base wall 14. The peripheral wall 30 includes a back wall 32, a front wall 34 and a pair of side walls 36 such that a bottom compartment 38 is defined. A dividing wall 40 extends between and is attached to the back and front walls 34 for dividing the compartment 38 into a first bin 42 and a second bin 44. A lid 46 is hingedly coupled to the dividing wall 40 for selectively covering the first bin 42. The dividing wall 40 extends upwardly above the peripheral wall. 30.

A handle 48 is attached to and extends upwardly from the base wall 14. The handle 48 includes a vertically orientated elongated member 50 that has a first end 52 and a second end 54. The first end 52 is attached to the base wall 14 and is adjacent to the back edge 18. The elongated member 50 has a bend 56 therein positioned nearer the second end 54 than the first end 52. The handle 48 extends vertically along an edge of the dividing wall 40.

A housing 58 includes an upper wall 60, a lower wall 62 and a perimeter wall 64 extending between the upper 60 and lower 62 walls. Each of the upper 60 and lower 62 walls has a generally rectangular shape. The housing 58 is vertically divided into a first half 66 and a second half 68. Each of the first 66 and second 68 halves are hingedly coupled to the elongated member 50 such that the housing 58 may be selectively positioned between a closed position over the base 12 and an open position extending outwardly from the base 12. Each of the first 66 and second 68 halves has an upper edge 70, a lower edge 72, an outer edge 74 and an inner edge 76 wherein the inner edges 76 are hingedly coupled to the handle 48. Each of the upper edges 70 has a plurality of indentations 78 therein for receiving a portion of a fishing pole 2. An elastomeric coating 79 is attached to and generally covers each of the indentations 78.

A plurality of drawers 11 is mounted in the first half 66 of the housing 58. A locking member 13 is attached to the housing 58 and is designed for selectively securing the housing 58 in the closed position.

In use, the present invention would house all various fishing equipment including rods, tackle, bait and other accessories. The present invention could be easily wheeled by a user to a desired location where they would have easy and organized access to their fishing equipment. Fishing rods 2 would be placed in the housing 58 so that the rod extends outward of the housing 58 and the rod positioned in the indentation 78 to hold it in place. The elastomeric coating 79 protects the rod 2. The bins 42 and drawers 11 are used for holding lures, line, bobbers and any other accessories required for fishing. The handle 48 and wheels 28 provide easy mobility of the assembly 10.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing pole and accessory caddy assembly comprising:
    a base including a base wall having a front edge, a back edge and a pair of side edges, a front support being attached to and extending downward from said front edge, an axle being attached to said base wall and being positioned adjacent to said back edge, a pair of wheels being attached to opposite ends of said back edge;
    a handle being attached to and extending upwardly from said base wall, said handle comprising a vertically orientated elongated member having a first end and a second end, said first end being attached to said base wall adjacent to said back edge; and
    a housing including an upper wall, a lower wall and a perimeter wall extending between said upper and lower walls, each of said upper and lower walls having a generally rectangular shape, said housing being vertically divided into a first half and a second half, each of said first and second halves being hingedly coupled to said elongated member such that said housing may be selectively positioned between a closed position over said base and an open position extending outwardly from said base.

2. The fishing pole and accessory caddy assembly as in claim 1, wherein said base further includes a peripheral wall being attached to said base wall, said peripheral wall including a back wall, a front wall and a pair of side walls such that a bottom compartment is defined.

3. The fishing pole and accessory caddy assembly as in claim 2, wherein said base further includes a dividing wall extending between and being attached to said back and front walls for dividing said compartment into a first bin and a second bin.

4. The fishing pole and accessory caddy assembly as in claim 3, wherein said base further includes a lid being hingedly coupled to said dividing wall for selectively covering said first bin.

5. The fishing pole and accessory caddy assembly as in claim 2, wherein said dividing wall extends upwardly above said peripheral wall and along said elongated member.

6. The fishing pole and accessory caddy assembly as in claim 1, wherein said elongated member has a bend therein positioned nearer said second end than said first end.

7. The fishing pole and accessory caddy assembly as in claim 1, wherein each of said first and second halves has an upper edge, a lower edge, an outer edge and an inner edge wherein said inner edges are hingedly coupled to said handle, each of said upper edges having a plurality indentations therein for receiving a portion of a fishing pole.

8. The fishing pole and accessory caddy assembly as in claim 7, further including an elastomeric coating being attached to and generally covering each of said indentations.

9. The fishing pole and accessory caddy assembly as in claim 1, further including a plurality of drawers being mounted in said first half of said housing.

10. The fishing pole and accessory caddy assembly as in claim 1, further including a locking member being attached to said housing and being adapted for selectively securing said housing in said closed position.

11. The fishing pole and accessory caddy assembly as in claim 2, wherein each of said first and second halves has an upper edge, a lower edge, an outer edge and an inner edge wherein said inner edges are hingedly coupled to said handle, each of said upper edges having a plurality indentations therein for receiving a portion of a fishing pole.

12. The fishing pole and accessory caddy assembly as in claim 11, further including an elastomeric coating being attached to and generally covering each of said indentations.

13. A fishing pole and accessory caddy assembly comprising:
    a base including a base wall having a front edge, a back edge and a pair of side edges, a front support being attached to and extending downward from said front edge, an axle being attached to said base wall and being positioned adjacent to said back edge, a pair of wheels being attached to opposite ends of said axle, a peripheral wall being attached to said base wall, said peripheral wall including a back wall, a front wall and a pair of side walls such that a bottom compartment is defined, a dividing wall extending between and being attached to said back and front walls for dividing said compartment into a first bin and a second bin, a lid being hingedly coupled to said dividing wall for selectively covering said first bin, said dividing wall extending upwardly above said peripheral wall;
    a handle being attached to and extending upwardly from said base wall, said handle comprising a vertically orientated elongated member having a first end and a second end, said first end being attached to said base wall adjacent to said back edge, said elongated member having a bend therein positioned nearer said second end than said first end, said handle vertically along an edge of said dividing wall;
    a housing including an upper wall, a lower wall and a perimeter wall extending between said upper and lower walls, each of said upper and lower walls having a generally rectangular shape, said housing being vertically divided into a first half and a second half, each of said first and second halves being hingedly coupled to said elongated member such that said housing may be selectively positioned between a closed position over said base and an open position extending outwardly from said base, each of said first and second halves having an upper edge, a lower edge, an outer edge and an inner edge wherein said inner edges are hingedly coupled to said handle, each of said upper edges having a plurality indentations therein for receiving a portion of a fishing pole, an elastomeric coating being attached to and generally covering each of said indentations;
    a plurality of drawers being mounted in said first half of said housing; and
    a locking member being attached to said housing and being adapted for selectively securing said housing in said closed position.

* * * * *